(12) United States Patent
Guo et al.

(10) Patent No.: US 10,293,537 B2
(45) Date of Patent: May 21, 2019

(54) DEVICE FOR BIAXIALLY-ORIENTED STRETCHING POLYTETRAFLUOROETHYLENE HOLLOW FIBER MEMBRANES AND METHOD THEREOF

(71) Applicant: ZHEJIANG SCI-TECH UNIVERSITY, Hangzhou (CN)

(72) Inventors: Yuhai Guo, Hangzhou (CN); Hailin Zhu, Hangzhou (CN); Feng Wang, Hangzhou (CN); Huapeng Zhang, Hangzhou (CN)

(73) Assignee: ZHEJIANG SCI-TECH UNIVERSITY, Hangzhou (CN)

( * ) Notice: Subject to any disclaimer, the term of this patent is extended or adjusted under 35 U.S.C. 154(b) by 757 days.

(21) Appl. No.: 14/785,526

(22) PCT Filed: Sep. 1, 2014

(86) PCT No.: PCT/CN2014/085682
§ 371 (c)(1),
(2) Date: Oct. 19, 2015

(87) PCT Pub. No.: WO2016/033726
PCT Pub. Date: Mar. 10, 2016

(65) Prior Publication Data
US 2016/0257049 A1      Sep. 8, 2016

(51) Int. Cl.
*B29C 55/26*        (2006.01)
*B29C 47/00*        (2006.01)
(Continued)

(52) U.S. Cl.
CPC ...... *B29C 47/0057* (2013.01); *B01D 67/0027* (2013.01); *B01D 69/08* (2013.01); *B01D 71/36* (2013.01); *B29C 47/0014* (2013.01); *B29C 47/92* (2013.01); *B29C 55/26* (2013.01); *B01D 2323/08* (2013.01); *B01D 2323/42* (2013.01); *B29C 47/0026* (2013.01); *B29C 47/94* (2013.01); *B29C 2947/9258* (2013.01); *B29C 2947/92704* (2013.01); *B29K 2027/18* (2013.01); *B29L 2022/00* (2013.01)

(58) Field of Classification Search
CPC ..................................................... B29C 55/26
See application file for complete search history.

(56) References Cited

U.S. PATENT DOCUMENTS 4,826,725 A * 5/1989 Harlow ............... B29C 47/0004
174/110 FC
5,096,634 A * 3/1992 Tsadares ............. B29C 47/0023
264/178 R
(Continued)

*Primary Examiner* — Timothy Kennedy
(74) *Attorney, Agent, or Firm* — Zhihua Han

(57) ABSTRACT

The present disclosure discloses a device for biaxially-oriented stretching polytetrafluoroethylene hollow fiber membranes and the method thereof. The device may include a lubricant removing oven and a tube blank heating oven mounted at the outlet end of the push-compression mold, a core extension extending from the core into the lubricant removing oven and the tube blank heating oven, and a speed regulating guide wheel mounted at the outlet of the tube blank heating oven. A tube blank is extruded from a push-compression machine, inserted on the core extension for removal of lubricant in the lubricant removing oven, heated in the tube blank heating oven, transversely stretched by means of the bulked core, and then wound onto the speed regulating guide wheel for longitudinal stretching. Both transverse and longitudinal stretching can be realized for polytetrafluoroethylene tube blanks, overcoming disadvantages of traditional processing devices that can merely perform longitudinal stretching.

2 Claims, 2 Drawing Sheets

(51) Int. Cl.
  *B01D 69/08* (2006.01)
  *B01D 71/36* (2006.01)
  *B29C 47/92* (2006.01)
  *B01D 67/00* (2006.01)
  *B29C 47/94* (2006.01)
  *B29K 27/18* (2006.01)
  *B29L 22/00* (2006.01)

(56) References Cited

U.S. PATENT DOCUMENTS

| | | | | |
|---|---|---|---|---|
| 5,785,906 | A * | 7/1998 | Prenger | B29C 47/0023 264/209.4 |
| 5,817,270 | A * | 10/1998 | Prenger | B29C 47/0023 264/290.2 |
| 5,948,332 | A * | 9/1999 | Prenger | B29C 47/0023 264/209.5 |
| 6,053,214 | A * | 4/2000 | Sjoberg | B32B 1/08 138/134 |
| 2002/0022101 | A1* | 2/2002 | Lenthe | B29C 47/0023 428/36.9 |
| 2003/0141617 | A1* | 7/2003 | Prevotat | B29C 47/0023 264/40.7 |
| 2007/0244539 | A1* | 10/2007 | Lentz | A61F 2/06 623/1.4 |
| 2012/0201988 | A1* | 8/2012 | Hansen | B01D 53/228 428/36.91 |

* cited by examiner

DEVICE FOR BIAXIALLY-ORIENTED STRETCHING POLYTETRAFLUOROETHYLENE HOLLOW FIBER MEMBRANES AND METHOD THEREOF

CROSS REFERENCE TO RELATED APPLICATION

This application is a national stage application of International application number PCT/CN2014/085682, filed Sep. 1, 2014, titled "A Device for Biaxially-Oriented Stretching Polytetrafluoroethylene Hollow Fiber Membranes and Method Thereof," which is hereby incorporated by reference in its entirety.

TECHNICAL FIELD

The present disclosure relates to a device for biaxially-oriented stretching hollow fiber membranes and the method thereof, and more specifically, to a device for biaxially-oriented stretching polytetrafluoroethylene hollow fiber membranes and the method thereof.

BACKGROUND

Hollow fiber membranes are widely used in the field of membrane separation, such as reverse osmosis, ultra-filtration, microfiltration, membrane contactors and membrane reactors separation. Common hollow fiber membrane materials include cellulose acetate, polyvinyl chloride, polypropylene, polyethylene, polyacrylonitrile, polysulfone and poly(ether sulfone). There are different requirements for hollow fiber membranes in different applications, such as membrane pore size, porosity, mechanical property and corrosion resistance. Polytetrafluoroethylene has powerful other good characteristics, acid and alkali resistance, oxidation resistance, microorganism resistance, high and low temperature resistance and other good characteristics. The polytetrafluoroethylene hollow fiber membrane has significant application value in the fields of special filtration, membrane contactors, membrane reactors, etc. for it also has advantages of high strength and flux in addition to the goods characteristics of polytetrafluoroethylene.

One method for processing the polytetrafluoroethylene hollow fiber membrane is that: polytetrafluoroethylene resin is used for paste extrusion under the action of lubricants to obtain a polytetrafluoroethylene tube blank; after removal of lubricants (removal of lubricant), the polytetrafluoroethylene tube blanks is stretched and sintered into a polytetrafluoroethylene hollow fiber membrane with micropores on the hollow fiber wall. Stretching is a key link in forming micropores, controlling micropore size and controlling the hollow fiber membrane structure, but there are few reports and patents concerning this aspect.

With regard to the link of extrusion, polytetrafluoroethylene tube blanks are generally extruded by using a push-compression machine whose extrusion mould comprises a cone mould, a die and core (as described in Fluoroplastic Processing and Application, Chemical Industrial Press, first edition and first printing in Beijing in July 2010, Page 152-154, Qian Zhimian, Bao Yongzhong, et al.) and the structure is as shown in FIG. 1. In practical use, the core is generally 1-3 mm longer than the die at the lower end.

One tube blank is extruded from one extrusion mould of the device mentioned above. ZL201010185858.1 discloses a mould for extruding and molding expanded polytetrafluoroethylene tubes which can extrude several tube blanks.

Patents related to stretching in the world include U.S. Pat. No. 4,250,138, which discloses a polytetrafluoroethylene hollow fiber stretching device. The device is similar to stretching devices in the form of seamless metal tubes and stretches polytetrafluoroethylene by means of a round-hole mould and mandrel.

U.S. Pat. No. 4,496,507 discloses a heating grooved roller stretching device in which heating rollers are adopted for controlling the temperature. The device stretches one hollow fiber for one time and tends to crack and collapse hollow fibers in stretching.

Patent ZL201010508798.2 discloses a polytetrafluoroethylene hollow fiber-stretching device, which is a device designed for removing lubricant and stretching fibers and comprising guide rollers, stretching rollers and cooling rollers. Patent ZL201010504784.3 discloses a method for controlling the pore size of polytetrafluoroethylene hollow fiber membranes, which controls the pore size by applying water dispersible fluorine-containing dispersion concentrates on the surface of polytetrafluoroethylene hollow fiber membranes.

In sum, under conventional techniques, stretching is performed along the length of tube blanks no matter what kind of stretching devices or means are used.

SUMMARY

The present disclosure is to provide a device for biaxially-oriented stretching polytetrafluoroethylene hollow fiber membranes and the method thereof to realize biaxially-oriented stretching (transversely and longitudinal), so as to improve the porosity of polytetrafluoroethylene hollow fiber membranes.

The technical solution adopted in the present disclosure is provided as follow.

A device for biaxially-oriented stretching polytetrafluoroethylene hollow fiber membranes: comprises a lubricant removing oven and a tube blank heating oven mounted at the outlet end of the extrusion mould in turn; comprises a core extension linearly extending from the core of the extrusion mould into the lubricant removing oven and the tube blank heating oven, wherein the core extension in the tube blank heating oven is increased in diameter to form a bulked core for traverse stretching; comprise a speed regulating guide wheel mounted at the outlet of the tube blank heating oven, designed for longitudinal stretching and positioned under the bottom of core extension.

A tube blank is extruded from a push-compression machine, inserted on the core extension for removal of lubricant in the lubricant removing oven, heated in the tube blank heating oven, and then transversely stretched by means of the bulked core. After leaving the bulked core, the tube blank is wound onto the speed regulating guide wheel for longitudinal stretching by adjusting the speed.

The bulked core is larger by 10%~300% than the core of the extrusion mould in diameter.

The tube blank is a polytetrafluoroethylene tube blank.

A method for biaxially-oriented stretching polytetrafluoroethylene hollow fiber membranes, including the following steps.

1) The tube blank is extruded from the push-compression machine. The tube blank is inserted on the core extension linearly extending from the core of the extrusion mould and sent into the lubricant removing oven to remove lubricant from the extrusion mould.

2) After lubricant removal, the tube blank is sent into the tube blank heating oven for heating from the lubricant removing oven, and then transversely stretched by means of the bulked core in the lubricant removing oven, wherein the bulked core is formed by increasing the diameter of the core extension located in the tube blank heating oven.

3) After leaving the bulked core in the tube blank heating oven, the tube blank is wound onto the speed regulating guide wheel at the outlet of the tube blank heating oven and longitudinally stretched by adjusting the speed of the speed regulating guide wheel, thus completing the biaxially-oriented stretching for the hollow fiber membrane of the tube blank.

In Step 2), the lubricant removing temperature of the tube blank in the lubricant removing oven is 120~300° C. and the retention time for lubricant removal is 3 seconds to 5 minutes.

In Step 2), the heating temperature of the tube blank in the tube blank heating oven is 150~360° C. and the retention time for heating is 3 seconds to 5 minutes.

The diameter of the tube blank is increased by 10%~300% after transverse stretching.

The length of the tube blank is increased by 10%~300% after longitudinal stretching.

Compared with the prior art, the present disclosure has the following beneficial effects: both transverse and longitudinal stretching can be realized for polytetrafluoroethylene tube blanks through the present disclosure, overcoming the disadvantage of traditional processing equipment that only longitudinal stretching can be realized. Realization of biaxially-oriented stretching can improve the porosity of polytetrafluoroethylene hollow fiber membranes significantly.

BRIEF DESCRIPTION OF THE DRAWINGS

In FIGS. 1 and 2, 1 represents a cone mould; 2 represents die; 3 represents a core; 4 represents a tube blank; 5 represents a lubricant removing oven; 6 represents a tube blank heating oven; 7 represents a bulked core; 8 represents a bulked tube blank; and 9 represents a speed regulating guide wheel.

DETAILED DESCRIPTION OF THE PREFERRED EMBODIMENTS

The present disclosure is further detailed by the embodiments in combination with the drawings.

Figure 2:
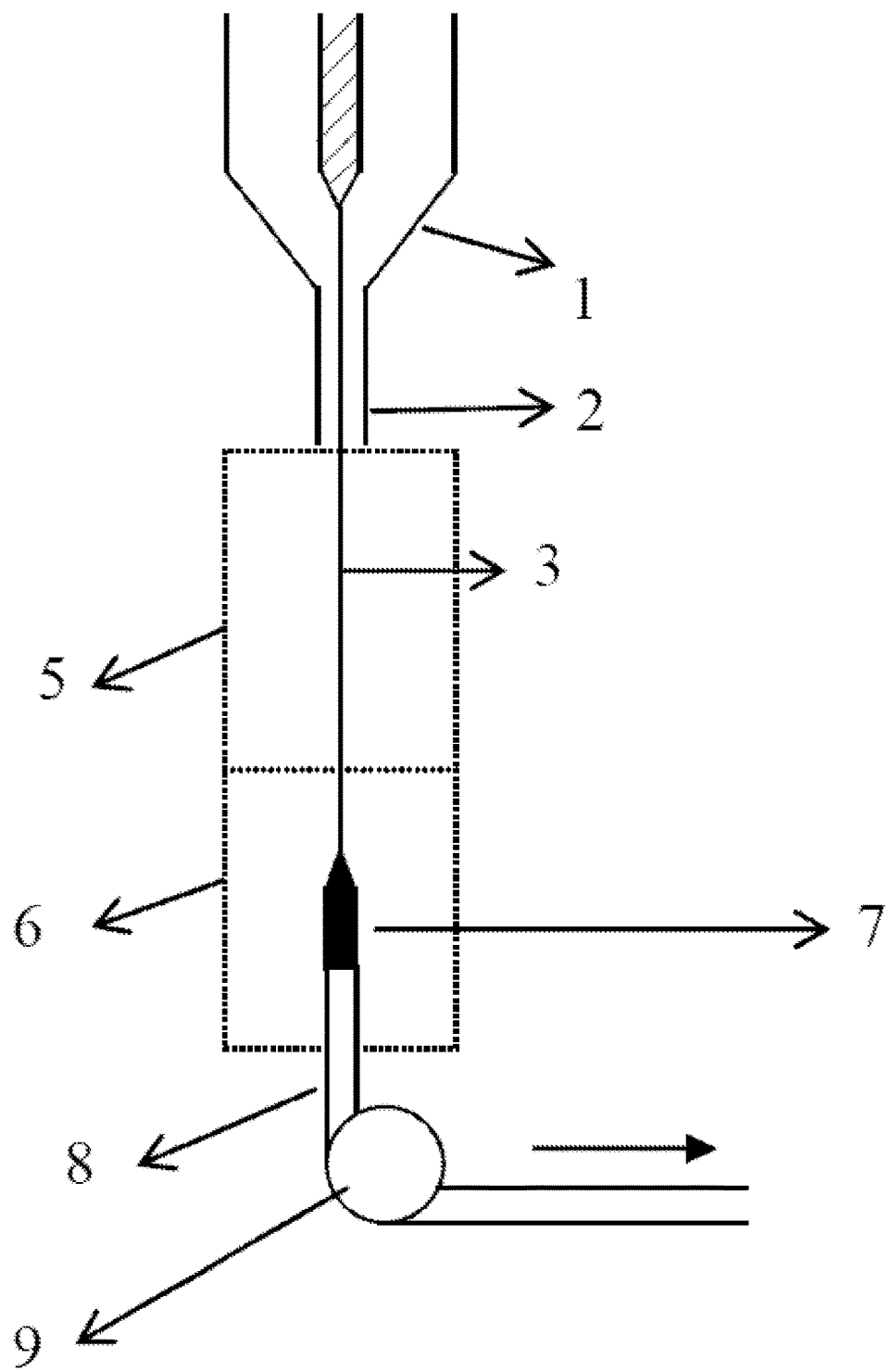
FIG. 2 illustrates a structure of the present disclosure.

As shown in FIG. 2, the present disclosure comprises a extrusion mould of a push-compression machine, a lubricant removing oven 5, a tube blank heating oven 6 and a speed regulating guide wheel 9, wherein the extrusion mould comprises a cone mould 1, die 2 or core 3. The lubricant removing oven 5 and the tube blank heating oven 6 are mounted on the outlet end of the extrusion mould in turn and closely connected with each other. The core extension in the tube blank heating oven 6 is increased in diameter to form a bulked core 7 with which the tube blank 4 is transversely stretched to form a bulked tube blank 8, and a speed regulating guide wheel 9 is provided for longitudinal stretching at the outlet of the tube blank heating oven 6 so that the tube blank 4 is wound onto the speed regulating guide wheel 9 for realizing the longitudinal stretching of the tube blank 4 by adjusting the speed. As shown in FIG. 2, the tube blank 4 is wound onto ¼ circumference of the speed regulating guide wheel 9 so that the tube blank 4 is longitudinally stretched when the speed of the speed regulating guide wheel 9 is greater than the descending speed of the tube blank 4 in the lubricant removing oven 5 and the tube blank heating oven 6.

The bulked core 7 is increased by 10%~300% than the core 3 of the push-compression mould 3 in diameter.

The tube blank 4 can be a polytetrafluoroethylene tube blank.

The method according to the present disclosure includes the following steps:

1) extruded from the push-compression machine, a tube blank 4 is inserted on the core extension linearly extending from the core 3 of the push-compression mould and sent into the lubricant removing oven 5 to remove lubricant from the push-compression mould; the preferred lubricant removing temperature is 120~300° C. and the retention time for lubricant removal is 3 seconds to 5 minutes.

2) after lubricant removal, the tube blank is sent into the tube blank heating oven 6 for heating from the lubricant removing oven 5, wherein the preferred heating temperature is 150~360° C. and the retention time for heating is 3 seconds to 5 minutes, then transversely stretched by means of the bulked core 7 in the lubricant removing oven 5, wherein the diameter of the tube blank is increased by 10%~300% after transverse stretching and the bulked core 7 is formed by increasing the diameter of the core extension located in the tube blank heating oven 6;

3) after leaving the bulked core 7 in the tube blank heating oven 6, the tube blank 4 is wound onto the speed regulating guide wheel 9 at the outlet of the tube blank heating oven 6 and longitudinally stretched by adjusting the speed of the speed regulating guide wheel 9, thus completing the biaxially-oriented stretching for the hollow fiber membrane of the tube blank, wherein the speed of the speed regulating guide wheel 9 is adjusted to be greater than the speed of the tube blank 4 descending from the outlet of the tube blank heating oven 6 so as to realize stretching, and the length of the tube blank 4 is increased by 10%~300% after longitudinal stretching.

In the present disclosure, the core of the existing extrusion mould is extended and the extension is positioned in the two ovens which are used for removing lubricant and heating tube blanks respectively.

The embodiments of the present disclosure are provided as follow.

Figure 1:
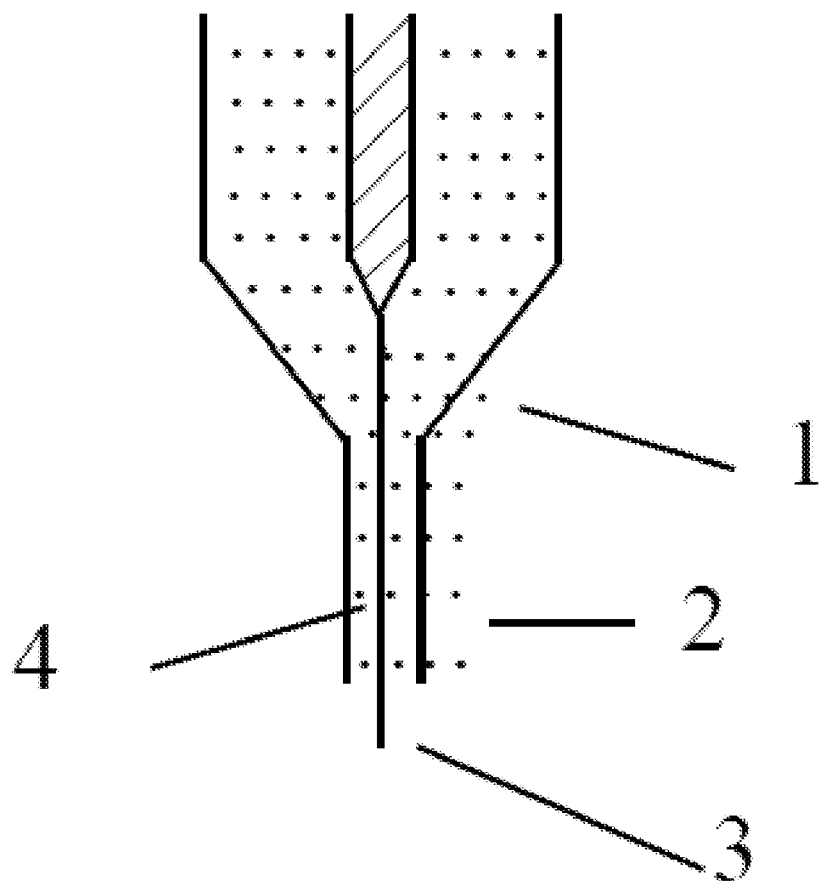
FIG. 1 illustrates a structure of an existing extrusion mould.

Embodiment I:

(1) Lubricant removal and transverse stretching of polytetrafluoroethylene tube blanks: a polytetrafluoroethylene tube blank is extruded by using a push-compression machine and then sent into a device for biaxially-oriented stretching polytetrafluoroethylene hollow fiber membranes as shown in FIG. 1, specifically, the tube blank is sent into a lubricant removing oven to remove lubricant for 5 min at a temperature of 120° C., sent into a tube blank heating oven for heating for 5 min at a temperature of 150° C., and transversely stretched by 10% by means of a bulked core in the tube blank heating oven to form a bulked tube blank. i.e., the bulked core 7 is increased by 10% than the core 3 of the extrusion mould in diameter;

(2) biaxially-oriented stretching of polytetrafluoroethylene hollow fiber membranes: the bulked tube blank is longitudinally stretched by 100% by means of the speed regulating guide wheel under the biaxially-oriented stretching device to form a biaxially-oriented polytetrafluoroethylene hollow fiber membrane with the porosity of 55%.

Embodiment II:

(1) Lubricant removal and heating of polytetrafluoroethylene tube blanks: a polytetrafluoroethylene tube blank is extruded by using a push-compression machine and then sent into a device for biaxially-oriented stretching polytetrafluoroethylene hollow fiber membranes as shown in FIG. 1. For example, the tube blank is sent into a lubricant removing oven to remove lubricant for 3 seconds at a temperature of 300° C., sent into a tube blank heating oven for heating for 3 seconds at a temperature of 360° C., and transversely stretched by 300% by means of a bulked core in the tube blank heating oven to form a bulked tube blank. i.e., the bulked core 7 is increased by 300% than the core 3 of the extrusion mould in diameter. (2) Biaxially-oriented stretching of polytetrafluoroethylene hollow fiber membranes: the bulked tube blank is longitudinally stretched by 300% by means of the speed regulating guide wheel under the biaxially-oriented stretching device to form a biaxially-oriented polytetrafluoroethylene hollow fiber membrane with the porosity of 90%.

Embodiment III:

(1) Lubricant removal and heating of polytetrafluoroethylene tube blanks: a polytetrafluoroethylene tube blank is extruded by using a push-compression machine and then sent into a device for biaxially-oriented stretching polytetrafluoroethylene hollow fiber membranes. Specifically, the tube blank is sent into a lubricant removing oven to remove lubricant for 1 minute at a temperature of 200° C., sent into a tube blank heating oven for heating for 1 minute at a temperature of 220° C., and transversely stretched by 150% by means of a bulked core in the tube blank heating oven to form a bulked tube blank. i.e., the bulked core 7 is increased by 150% than the core 3 of the extrusion mould in diameter;

(2) biaxially-oriented stretching of polytetrafluoroethylene hollow fiber membranes: the bulked tube blank is longitudinally stretched by 200% by means of the speed regulating guide wheel under the biaxially-oriented stretching device to form a biaxially-oriented polytetrafluoroethylene hollow fiber membrane with the porosity of 82%.

The embodiments above are for describing the present disclosure and not intended to limit the present disclosure. Any modification and changes can be made to the present disclosure without deviating from the spirit and protection scope claimed in the Claims, and these modifications and changes are covered by the protection scope of the present disclosure.

What is claimed is:

1. A device for biaxially-oriented stretching polytetrafluoroethylene hollow fiber membranes, comprising:

a lubricant removing oven (5) and an adjoining tube blank heating oven (6) that are mounted in turn at an outlet end of an extrusion mould, wherein the lubricant removing oven (5) is configured to reach a temperature of 120~300° C. to remove lubricant, and wherein the adjoining tube blank heating oven (6) is configured to heat further to 150~360° C.;

a core extension linearly extending from a core (3) of the extrusion mould into the lubricant removing oven (5) and partly into the tube blank heating oven (6), the core extension in the tube blank heating oven (6) increasing in diameter such as to form a bulked core (7) that is entirely positioned within the tube blank heating oven (6), wherein the bulked core (7) is configured to for traversely stretch a tube blank while positioned within tube blank heating oven (6); and a speed regulating guide wheel (9) mounted at the outlet of the tube blank heating oven (6), wherein the speed regulating guide wheel (9) is configured to be wound by and to longitudinally stretch the traversely stretched tube blank by adjusting the speed of the traversely stretched tube blank after leaving the bulked core and wherein the speed regulating guide wheel (9) is positioned under a bottom of the core extension.

2. The device of claim 1, wherein the bulked core is increased by about 10%~300% than the core of the extrusion mould in diameter.

* * * * *